United States Patent [19]

Jorgensen et al.

[11] Patent Number: 5,059,575
[45] Date of Patent: Oct. 22, 1991

[54] CATALYST FOR THE OXIDATION OF CARBONACEOUS PARTICULATES AND METHOD OF MAKING THE CATALYST

[75] Inventors: Norman Jorgensen, Reading; Michael J. Davies, Wallingford, all of United Kingdom; James A. Cairns, Dundee, Scotland; Paul G. Deards, Reading, United Kingdom

[73] Assignee: United Kingdom Atomic Energy Authority, United Kingdom

[21] Appl. No.: 539,481

[22] Filed: Jun. 18, 1990

[30] Foreign Application Priority Data

Jun. 17, 1989 [GB] United Kingdom ............... 8913978

[51] Int. Cl.$^5$ ..................... B01J 23/04; B01J 23/10
[52] U.S. Cl. .................................. 502/304; 423/215.5
[58] Field of Search ................. 502/304; 423/215.5

[56] References Cited

U.S. PATENT DOCUMENTS

| | | | |
|---|---|---|---|
| 3,993,572 | 11/1976 | Hindin et al. | 252/462 |
| 4,001,143 | 1/1977 | McCann, III | 252/462 |
| 4,154,812 | 5/1979 | Sanchez et al. | 423/626 |
| 4,476,246 | 10/1984 | Kim et al. | 502/304 |
| 4,711,870 | 12/1987 | Yamada et al. | 502/304 X |

FOREIGN PATENT DOCUMENTS

| | | |
|---|---|---|
| 0115290A2 | 1/1984 | European Pat. Off. |
| 0142859A2 | 11/1984 | European Pat. Off. |
| 1106332 | 4/1965 | United Kingdom . |
| 1342893 | 2/1970 | United Kingdom . |
| 1478093 | 2/1975 | United Kingdom . |
| 2088236A | 11/1981 | United Kingdom . |
| 2116868A | 3/1983 | United Kingdom . |

*Primary Examiner*—W. J. Shine
*Attorney, Agent, or Firm*—Larson and Taylor

[57] ABSTRACT

A catalyst for the oxidation of carbonaceous particulates carried in a gaseous phase, for example for the treatment of Diesel engine exhaust emissions, comprises a substrate for permitting flow of the gaseous phase therethrough coated with a high surface area ceramic oxide (for example alumina made by a vapor phase condensation method such as flame hydrolysis), cerium-(IV) oxide, and a compound such as an oxide, carbonate or nitrate of an element of Group 1A of the Periodic Table. The substrate may be in the form of a ceramic honeycomb such as of cordierite, or of metal sheets (e.g. of an aluminium bearing ferritic alloy) shaped and wound to define gas flow channels, or of ceramic or metal foams, particles or wires in random or structured arrangement. The catalyst may include other components (e.g. transition metals such as Co, Cu, and Mn; Pb; and precious metals such as Pt and Pd) for enhancing performance.

19 Claims, No Drawings

CATALYST FOR THE OXIDATION OF CARBONACEOUS PARTICULATES AND METHOD OF MAKING THE CATALYST

This invention relates to catalysts for the oxidation of carbonaceous particulates carried in a gaseous phase, for example, for the treatment of Diesel engine exhaust emissions.

Carbonaceous material can deposit in many systems, thereby giving rise to problems such as metal surface embrittlement, catalyst deactivation and alteration of the heat transfer characteristics of metals. Examples of such systems are furnace linings, catalyst systems and nuclear reactors. Also, the presence of carbonaceous particulates in Diesel engine exhaust emissions is now recognised as a significant environmental and health problem. There is, therefore, a need for removing carbonaceous particulates from gaseous phases in which they are carried. The main way in which this has been done to date is to collect the particles in a trap and incinerate them periodically. See, for example, Canadian Patent No 367,210. The trap, however, needs cleaning periodically.

The present invention is concerned with catalytic removal of carbonaceous particulates whereby the particulates are removed dynamically without the need to stop process operations for cleaning purposes. The invention is specifically concerned with a novel catalyst for the treatment of carbonaceous particulates in a gaseous system.

Thus, in one aspect, the invention provides a method of manufacturing a catalyst for the oxidation of carbonaceous particulates carried in a gaseous phase, which method comprises the steps of
a) preparing a ceramic oxide aquasol,
b) preparing an aquasol of cerium (IV) oxide,
c) mixing the ceramic oxide aquasol and the cerium (IV) oxide aquasol to form a mixed aquasol,
d) adding to the mixed aquasol a compound in a dispersed form (preferably a carbonate or nitrate) solution in water of a metal from Group IA of the Periodic Table,
e) applying the resultant mixture to a substrate to form a coating thereon, and
f) drying and calcining the coated substrate.

The invention includes the use for the catalytic oxidation of carbonaceous particulates carried in a gaseous phase of a catalyst comprising a substrate for permitting flow of the gaseous phase therethrough coated with a high surface area ceramic oxide, cerium (IV) oxide and a compound of an element of Group 1A of the Periodic Table.

The invention further includes a catalyst for the oxidation of carbonaceous particulates carried in a gaseous phase comprising a substrate for permitting flow of the gaseous phase therethrough coated with a high surface area ceramic oxide, cerium (IV) oxide and a compound of a metal of Group 1A of the Periodic Table, the ceramic oxide having surface area of 70 $m^2g^{-1}$ or greater and a structure comprising loose aggregates of primary particles, in which aggregates there are point to point contacts between the primary particles and spaces within the structure.

The catalyst has been found, in tests to be reported hereinafter, to have a low onset temperature for the oxidation of particulates from a Diesel engine exhaust, i.e. about 300° C. Furthermore, the catalyst may be suitable for catalytically treating other undesirable constituents of a gaseous phase such as hydrocarbons and carbon monoxide.

The ceramic oxide acts as a support material in combination with the cerium(IV) oxide. It has been found advantageous for the proportion by weight of ceramic oxide in the support material to be significantly greater than that of the cerium(IV) oxide. For example, the proportion of ceramic oxide may be 70% by weight or above, for example about 90%.

"High surface area" in respect of the ceramic oxide includes 70 $m^2g^{-1}$ or greater, for example 80-100 $m^2g^{-1}$. As a specific example, the ceramic oxide may be aluminium oxide whose specific surface area at a temperature below 1100° C. is not less than 70 $m^2g^{-1}$ (e.g. in the range 80 $m^2g^{-1}$ to 100 $m^2g^{-1}$) and whose total pore volume at any temperature below 1100° C. is not less than 0.50 $dm^3kg^{-1}$ (e.g. in the range from 0.50 $dm^3$ $kg^{-1}$ to 0.85 $dm^3$ $kg^{-1}$).

Specific examples of ceramic oxide are aluminium oxide, beryllium oxide, zirconium(IV) oxide, thorium(IV) oxide, silicon(IV) oxide, lanthanum(III) oxide, titanium(IV) oxide, and tin(IV) oxide. Aluminium oxide is preferred.

The ceramic oxide preferably has a structure comprising loose aggregates of primary-particles, in which aggregates there are point to point contacts between the primary-particles, and spaces within the structure. Such a structure is able substantially to maintain its surface area after heat treating because the point to point contacts offer few opportunities for sintering and hence loss of surface area. Such a ceramic oxide coating may be obtained by contacting the substrate with a dispersion of colloidal particles of the ceramic in a liquid medium, followed by drying and firing, the material of the colloidal particles having been made by a vapour phase condensation method such as flame hydrolysis. The preparation and use of such dispersions (or sols) to produce coatings is described in GB-A-1 568 861 (equivalent to U.S. Pat. No. 4,397,770).

It has been found to be advantageous to apply the cerium(IV) oxide at the same time as the ceramic oxide by mixing a cerium(IV) oxide sol (for example as described in UK Patent No GB-A-1342893) with a ceramic oxide sol as described above and contacting the mixed sol with the substrate, followed by drying and firing.

Generally, Group 1 carbonates (i.e. $Cs_2CO_3$, $Li_2CO_3$, $K_2CO_3$, $Rb_2CO_3$, $Na_2CO_3$) give rise to a superior performance than their corresponding oxides in the catalysts of this invention. However, since the carbonates decompose to the oxides, their improved catalytic performance may not be sustainable over an extended period of time. Of the Group 1 oxides, $Rb_2O$ and $Na_2O$ have been found to give the best catalytic performance.

The Group 1 oxides, carbonates or nitrates may be provided by including them, in solution, in admixture with the ceramic oxide and the cerium(IV) oxide, which admixture is contacted with the substrate, followed by drying and firing. If desired, for example to improve solubility, a precursor of a Group 1 oxide is used, which precursor is converted to the oxide during firing. A Group 1 nitrate may be used in this way, and the nitrate can be completely or partially converted to the oxide during firing.

The catalysts of the invention may, if desired, include other components. For example, one or more components known to have catalytic activity such as lead and compounds thereof or the transition metals (e.g. Ag, Cr, Mn, V, Co and Cu) and compounds thereof, such as their oxides (e.g. CoO, CuO and $Ag_2O$), including precious metals (e.g. Ru, Pt and Pd) or a combination of platinum and palladium may be included with a view to improving the ability of the catalyst to catalyse the oxidation of carbonaceous particulates, hydrocarbons and of carbon monoxide.

The substrate may be non-metallic (e.g. ceramic) or metallic and is preferably in the form of a multi-channel artefact for permitting flow of a gaseous phase therethrough, the walls defining the channels carrying the coating in the catalyst of the invention. In one example, the substrate is a ceramic artefact, such as of cordierite, having a honeycomb structure. In another example, the substrate is a metallic artefact in the form of one or more sheets so shaped and wound (e.g. in Swiss roll fashion) as to define channels between plane and corrugated portions of sheet(s).

An example of a metal that may be used to fabricate the substrate is an aluminium-bearing iron base alloy. Such alloys are known to resist corrosion and, e.g. when in the form of aluminium-bearing ferritic steels, are known to oxidize to form a substantially alumina protective oxide layer, the integrity of which is maintained by supply of aluminium from within the alloy to sustain oxide growth and to repair flaws. Examples of such steels are those of the following composition by weight: 1-30% Cr, 1-10% Al, 0-05% Y, and the balance Fe. Such steels may be available in the UK under the UK Registered Trade Mark "FECRALLOY" where the steel composition includes a small proportion of Y; examples are steels in the composition range by weight: 15-22% Cr, 4-5.2% Al, 0.05-0.4% Y, and the balance Fe. The art contains many references to aluminium-bearing ferritic steels. See, for example, J. E. Antill, 'Fecralloy Steels' Stainless Steel Ind. 7 (36) March 1979, and P. T. Moseley et al., 'The Microstructure of the Scale Formed During the High Temperature Oxidation of Fecralloy Steel', Corrosion Science 24 No 6 (1984) p.547.

Other forms of substrate that may be used in the practice of the invention are ceramic or metal foams, particles and wires in a random array or a structured form.

In use of the catalyst of the invention, one or more such catalysts may be used in a particular catalytic operation, for example in parallel or in series or both.

The invention will now be described, by way of example only, as follows:

EXAMPLE 1

Preparation of Catalyst

An alumina aquasol (concentration 270 g $Al_2O_3$ $l^{-1}$) was prepared by dispersing in water alumina that had been made by flame hydrolysis. A cerium (IV) oxide aquasol made by the method described in GB-A-1 342 893 was mixed with the alumina aquasol such that there was 90% $Al_2O_3$: 10% $CeO_2$ in the resulting mixed sol.

An alkali metal carbonate or nitrate was dissolved in water and the solution added to the mixed sol. The amount of alkali metal carbonate or nitrate was such as to give rise to about 4-50% by weight of oxide or carbonate in the final catalyst (excluding the substrate). The resulting mixture was contacted with a catalyst substrate, dried overnight at 80° C. and calcined in an oven at 600° C.

Tests on Catalyst

A catalyst prepared as above, but not having being contacted with a substrate and having being thoroughly ground after drying and before calcining, was mixed with 20% by weight of lampblack and then subjected to thermogravimetric analysis (TGA) using a Dupont 951 thermogravimetric analyser module in conjunction with a Dupont 1090 thermal analyser. Each test sample (weight between 18 and 25 mg) was heated at 10° C. $min^{-1}$ and air passed over the sample at a flow rate of 40 $cm^3 min^{-1}$. The analysis was done over the temperature range 25° C. to 750° C. The lampblack was oxidised by air to carbon dioxide.

TGA enabled the following information to be obtained:

onset temperature. This is the temperature where carbon just begins to oxidize significantly and burn to $CO_2$ (i.e. where weight loss starts).

ignition temperature. This is the temperature at which rate of gasification of the carbon is a maximum. It is a semi-quantitative measure of catalytic activity.

Results

The results are given in the table below where all of the catalysts tested contained 15% by weight of alkali metal with the exception of catalyst (1) which contained no alkali metal and is included for comparison purposes only, i.e. catalyst (1) is not a catalyst of the invention.

| Catalyst | | Onset Temp (°C.) | Ignition Temp (°C.) |
| --- | --- | --- | --- |
| — | (1) | 400 | 565 |
| $Li_2O$ | (2) | 420 | 488 |
| $Li_2CO_3$ | (3) | 420 | 504 |
| $Na_2O$ | (4) | 370 | 415 |
| $Na_2CO_3$ | (5) | 370 | 470 |
| $K_2O$ | (6) | 390 | 430 |
| $K_2CO_3$ | (7) | 350 | 420 |
| $Cs_2O$ | (8) | 350 | 410 |
| $Cs_2CO_3$ | (9) | 350 | 410 |
| $Rb_2O$ | (10) | 360 | 430 |
| $Rb_2CO_3$ | (11) | 360 | 420 |

The ignition temperature gives an indication of the relative activity of the catalysts but, due to the rapid exothermic nature of the oxidation reaction, does not necessarily give an accurate quantitative comparison. It can be seen that the catalysts of the invention ((2) to (11) were superior to the comparison catalyst (1)).

EXAMPLE 2

Preparation of Catalyst

The procedure of Example 1 was repeated with the exception that a platinum or palladium salt ($Pt(NH_3)_4 Cl_2$ or $Pd(NH_3)_4 (NO_3)_2$) was also dissolved in the mixture applied to the substrate. The salts were decomposed to Pt or Pd metal and the amounts used were such as to give rise to about 2% by weight of Pt or Pd in the catalyst (excluding the substrate).

Tests on Catalysts

The tests were carried out as described in Example 1. Additionally the performance with respect to methane combustion was measured using a microreactor with a 0.8% methane in air feed-gas flowing at a space velocity of approximately 50,000 $h^{-1}$. The tempeature at which oxidation of methane was first observed is quoted as the light-off temperature (LOT) and the temperature at which 50% of the methane was converted is also quoted (T50).

Results

The results are given in the table below where catalysts (12) and (13) are for comparison purposes only, i.e. are not catalysts of the invention. (All °C.).

| Catalyst | | Lampblack Combustion | | CH4 Combustion | |
|---|---|---|---|---|---|
| | | Onset | Ignition | LOT | T50 |
| 2% Pt | (12) | 500 | 588 | 325 | 525 |
| 2% Pd | (13) | 500 | 585 | 300 | 525 |
| 2% Pt, 20% K2CO3 | (14) | 350 | 434 | 425 | 525 |
| 2% Pt, 20% Rb2CO3 | (15) | 350 | 408 | 350 | 600 |

It is therefore apparent that added precious metals only marginally affect the performance of the catalysts for carbon oxidation. However, added group 1A carbonates bring about some deactivation of precious metal catalysts for methane oxidation.

EXAMPLE 3

Preparation of Catalyst

To the alumina-ceria sol as prepared in Example 1 was added an equal proportion of either copper or cobalt nitrate. The resultant mixture was dried overnight at 80° C and calcined in an oven at 600° C. To a portion of the copper mixture a solution of sodium nitrate was added to give a final catalyst mixture containing 2% sodium oxide.

Tests on Catalysts

As described in Example 1 the prepared catalysts were tested using the TGA apparatus with lampblack as a source of carbon.

Results

The results are given in the table below where catalysts (16) and (17) are for comparison purposes only, i.e. are not catalysts of the invention.

| Catalyst | | Onset Temp (°C.) | Ignition Temp |
|---|---|---|---|
| CoO | (16) | 400 | 590 |
| CuO | (17) | 450 | 548 |
| CuO + 2% Na2O | (18) | 390 | 405 |

Added Cu and Co did not improve the carbon oxidation performance over that of the Group 1A catalysts, but when used in conjunction with them (e.g. catalyst (18)) did not result in a substantially worse performance either. It is probable that catalysts containing transition metal (oxides) will be more active than those without for reactions other than carbon oxidation.

EXAMPLE 4

Preparation of Catalyst

Catalysts (6) and (11) from Example 1 were used.

Tests on Catalysts

The TGA apparatus was used to determine catalyst efficiency as described in Example 1, but instead of using lampblack as the source of carbonaceous material, particulates were collected from the exhaust gases of a diesel engine and used. The particulates were mixed with the powdered catalyst in each case prior to testing.

Results

The results are given in the table below:

| Catalyst | Onset Temp (°C.) | Ignition Temp (°C.) |
|---|---|---|
| (6) | 364 | 380 |
| (11) | 335 | 348 |

Thus, the catalysts tested are shown to oxidize diesel exhaust particulates much more readily than they did lampblack.

We claim:

1. A method of manufacturing a catalyst for the oxidation of carbonaceous particulates carried in a gaseous phase, which method comprises the steps of:
   a) preparing a ceramic oxide aquasol,
   b) preparing an aquasol of cerium (IV) oxide,
   c) mixing the ceramic oxide aquasol and the cerium (IV) oxide aquasol to form a mixed aquasol,
   d) adding to the mixed aquasol a compound in a dispersed form of a metal from Group IA of the Periodic Table,
   e) applying the resultant mixture to a substrate to form a coating thereon, and
   f) drying and calcining the coated substrate.

2. A method according to claim 1 wherein the ceramic oxide aquasol and the cerium (IV) oxide aquasol are mixed to form a mixed sol in which the ratio of ceramic to cerium (IV) oxide is in the range 70% ceramic oxide: 30% cerium (IV) oxide to 90% ceramic oxide: 10% cerium (IV) oxide.

3. A method according to claim 1, wherein the compound of a metal from Group 1A of the Periodic Table is a carbonate or nitrate and the quantity added provides 4% to 50% by weight of oxide or carbonate in the final catalyst (excluding the substrate).

4. A method according to claim 1, wherein the ceramic oxide has a structure comprising loose aggregates of primary-particles, in which aggregates there are point to point contacts between the primary-particles, and spaces within the structure.

5. A method according to claim 1, wherein the ceramic oxide has been made by a vapor phase condensation method.

6. A method according to claim 5 wherein the vapor phase condensation method is flame hydrolysis.

7. A catalyst when made by the method according to claim 1.

8. A catalyst according to claim 7 wherein the substrate is in the form of a multi-channel or porous artefact for permitting flow of a gaseous phase therethrough, the coating being carried by the walls defining the channels or the pores.

9. A catalyst according to claim 8 wherein the artefact is of a foam or honeycomb structure, or a mesh like structure formed from wire.

10. A catalyst according to claim 8 wherein the artefact is of a ceramic.

11. A catalyst according to claim 9 wherein the artefact is of a metal.

12. A catalyst according to claim 11 wherein the metal is an aluminium-bearing ferritic alloy.

13. A catalyst for the oxidation of carbonaceous particulates carried in a gaseous phase comprising a substrate for permitting flow of the gaseous phase therethrough coated with a high surface area ceramic oxide, cerium (IV) oxide and a compound of a metal of Group 1A of the Periodic Table, the ceramic oxide having a surface area of 70 $m^2g^{-1}$ or greater and a structure comprising loose aggregates of primary particles, in which aggregates there are point to point contacts between the primary particles and spaces within the structure.

14. A catalyst according to claim 13 wherein the ceramic oxide has been made by a vapor phase condensation method.

15. A catalyst according to claim 14 wherein the vapor phase condensation method is flame hydrolysis.

16. A catalyst according to claim 13 wherein the coating additionally includes a transition metal or a compound thereof, or lead or a compound thereof.

17. A catalyst according to claim 16 wherein the transition metal is cobalt, copper, manganese, vanadium, chromium or a mixture of one or more thereof.

18. A catalyst according to claim 16 wherein the transition metal is a precious metal.

19. A catalyst according to claim 18, wherein the precious metal is platinum or palladium or both.

* * * * *